United States Patent
Chang et al.

(10) Patent No.: US 12,360,620 B2
(45) Date of Patent: Jul. 15, 2025

(54) OSD SYSTEM FOR PUBLIC-PLACE-DEVICE, AND SELF-SERVICE DEVICE

(71) Applicant: Elo Touch Solutions, Inc., Knoxville, TN (US)

(72) Inventors: Shih-Tsung Chang, New Taipei (TW); Chi-Liang Tai, New Taipei (TW)

(73) Assignee: Elo Touch Solutions, Inc., Knoxville, TN (US)

( * ) Notice: Subject to any disclaimer, the term of this patent is extended or adjusted under 35 U.S.C. 154(b) by 0 days.

(21) Appl. No.: 18/244,161

(22) Filed: Sep. 8, 2023

(65) Prior Publication Data

US 2024/0103650 A1 Mar. 28, 2024

(51) Int. Cl.
*G06F 3/041* (2006.01)
*G06F 3/04883* (2022.01)

(52) U.S. Cl.
CPC ........ *G06F 3/0412* (2013.01); *G06F 3/04883* (2013.01)

(58) Field of Classification Search
CPC ............................ G06F 3/0412; G06F 3/04883
See application file for complete search history.

(56) References Cited

U.S. PATENT DOCUMENTS

| 2016/0063230 A1* | 3/2016 | Alten | G06F 21/32 726/28 |
| 2020/0026835 A1* | 1/2020 | Mitchell | H04L 9/3247 |

* cited by examiner

*Primary Examiner* — Lisa S Landis
(74) *Attorney, Agent, or Firm* — Sterne, Kessler, Goldstein & Fox P.L.L.C.

(57) ABSTRACT

The present disclosure relates to a method of operating an OSD function for a public-place-device. The method includes: detecting a touch input through the touch screen while the OSD function is in the locked state; causing the OSD function to operate in the unlocked state in response to detecting a predetermined touch secret code, so as to output an OSD image on the display and conduct an OSD configuration of the display according to an OSD operation from an external entity; and causing the OSD function to operate in the locked state in response to receiving an OSD locking request while the OSD function is in the unlocked state, so as not to output the OSD image on the display and not to respond to an OSD operation from an external entity. The present disclosure also relates to an OSD system and a self-service device for the public-place-device.

20 Claims, 4 Drawing Sheets

OSD SYSTEM FOR PUBLIC-PLACE-DEVICE, AND SELF-SERVICE DEVICE

TECHNICAL FIELD

The present disclosure relates to electronic devices, and in particular to an OSD system for a public-place-device, and a self-service device.

BACKGROUND ART

FIG. 1 is a schematic diagram of a conventional display 10. The display 10 includes a display unit 11 and an input unit 12 disposed in an area adjacent to the display unit 11. The display unit 11 is configured to display a screen 31 according to received video data (for brevity, the "video data" recited herein includes data of various still images and moving images), and to display an On-Screen Display (OSD) image 32 in a manner of being superimposed on the screen 31 according to received control signals (e.g., control signals from the input unit 12 or from a remote control 20). In the illustrated example, the OSD image 32 indicating contrast and brightness is displayed over the screen 31. It should be noted that, the OSD image 32 may also be displayed on the display unit 11 without video data input from the display 10. For example, when the display 10 is not properly connected with a video signal cable, the OSD image 32 displayed in the display unit 11 may prompt a message such as "Please check the video input connection", while no screen 31 is presented under the OSD image 32.

The OSD image 32 is an image presented in the display unit 11 when a user adjusts configuration information of the display 10 by using an OSD system of the display 10, and is used to display the configuration information adjusted by using the OSD system so as to facilitate observations and operations by the user. The configuration information of the display 10 adjustable through the OSD system may include information such as color, resolution, screen size, grayscale, brightness, contrast, speaker volume, and a power switch of the display 10.

The OSD system includes an OSD input apparatus to enable the user to perform an OSD operation. The OSD input apparatus may include an input unit 12 provided on the display 10 and/or a remote control 20 provided for the display 10. The user may control and configure the display 10 by using any of the input unit 12 and the remote control 20. It should be understood that, all operable components or only some operable components of the input unit 12 and/or the remote control 20 may be used as the OSD input apparatus. The input unit 12 may be implemented as a component such as a knob, a key, a membrane switch or the like, which allows a signal to be input through a user operation. The remote control 20 may establish a communication connection with the display 10 in a wireless or wired manner. When using the OSD input apparatus to perform various configuration operations of the display 10, in addition to changing the configuration of the display 10, the operation is displayed on the display 10 as feedback in the form of the OSD image 32, so that the user may observe his/her operation performed. For example, when adjusting volume of a speaker of the display 10 by using the OSD input apparatus, this operation not only changes the volume of the speaker of the display 10, but this operation also causes the OSD image 32 representing a volume level of the speaker of the display 10 appear on the display unit 11 of the display 10.

CONTENT OF THE DISCLOSURE

One of objects of the present disclosure is to provide a method of operating an OSD function for a public-place-device, an OSD system for a public-place-device, and a self-service device.

According to a first aspect of the present disclosure, there is provided a method of operating an On-Screen Display (OSD) function for a public-place-device, wherein the public-place-device comprises a display and a touch screen, and the OSD function is capable of being operated in a locked state that disables an OSD configuration of the display by an external entity and an unlocked state that enables an external entity to perform the OSD configuration of the display; the method comprising: detecting a touch input through the touch screen while the OSD function is in the locked state; causing the OSD function to operate in the unlocked state in response to detecting a predetermined touch secret code, so as to output an OSD image on the display and conduct an OSD configuration of the display according to an OSD operation from an external entity; and causing the OSD function to operate in the locked state in response to receiving an OSD locking request while the OSD function is in the unlocked state, so as not to output the OSD image on the display and not to respond to an OSD operation from an external entity.

According to a second aspect of the present disclosure, there is provided an On-Screen Display (OSD) system for a public-place-device, wherein the public-place-device includes a display and a touch screen, and the OSD system comprises a touch controller and a display controller directly communicatively connected to the touch controller, and wherein the touch controller is configured to: detect a touch input through the touch screen, and send a first signal to the display controller in response to detecting a predetermined touch secret code; and the display controller is configured to: cause an OSD function of the OSD system to operate in an unlocked state in response to receiving the first signal while the OSD function is in a locked state, so as to output an OSD image on the display and respond to an OSD operation; and cause the OSD function to operate in the locked state in response to receiving an OSD locking request while the OSD function is in the unlocked state, so as not to output the OSD image on the display and not to respond to an OSD operation.

According to a third aspect of the present disclosure, there is provided a self-service device, including: a computing device configured to run an application program of the self-service device and generate video data associated with a screen for output; a display controller configured to adapt the video data; a display configured to output a screen according to adapted video data; a touch screen configured to receive a touch input; a touch controller configured to transmit a touch signal associated with the touch input to the computing device, wherein the touch controller is further configured to: detect a touch input through the touch screen, and send a first signal to the display controller in response to detecting a first specific touch input; and the display controller is further configured to: unlock an On-Screen Display (OSD) function in response to receiving the first signal, so as to output an OSD image on the display; and conduct an OSD configuration of the display in response to an operation performed by touching an area of the touch screen corresponding to at least part of the OSD image and/or an operation performed by a specific OSD input apparatus.

Other features of the present disclosure and advantages thereof will become apparent from the following detailed description of exemplary embodiments of the present disclosure with reference to the accompanying drawings.

BRIEF DESCRIPTION OF THE DRAWINGS

The accompanying drawings, which form a part of the description, illustrate embodiments of the present disclosure and together with the description serve to explain the principles of the present disclosure.

The present disclosure may be more clearly understood from the following detailed description with reference to the accompanying drawings, wherein.

It should be noted that, in the embodiments described below, the same reference number which denotes the same parts or parts having the same function may be commonly used in different drawings, and repeated descriptions thereof may be omitted. In some instances, similar numerals and letters are used to denote similar items, so once an item is defined in one drawing, it does not require further discussion in subsequent drawings.

EMBODIMENTS

The present disclosure will be described below with reference to the drawings, in which several embodiments of the present disclosure are shown. It should be understood, however, that the present disclosure may be implemented in many different ways, and is not limited to the embodiments described below. In fact, the embodiments described hereinafter are intended to make the present disclosure to be more complete and to adequately explain the scope of the present disclosure to a person skilled in the art. It should also be understood that, the embodiments disclosed herein can be combined in various ways to provide many additional embodiments.

It should be understood that, the wording in the present disclosure is only used for describing particular embodiments and is not intended to limit the present disclosure. All the terms used in the specification (including technical and scientific terms) have the meanings as normally understood by a person skilled in the art, unless otherwise defined. For the sake of conciseness and/or clarity, well-known functions or constructions may not be described in detail.

The term "A or B" used through the present disclosure refers to "A and B" and "A or B" rather than meaning that A and B are exclusive, unless otherwise specified.

The term "exemplary", as used herein, means "serving as an example, instance, or illustration" rather than as a "model" to be exactly reproduced. Any implementation described herein as exemplary is not necessarily to be construed as preferred or advantageous over other implementations. Furthermore, there is no intention for the present disclosure to be bound by any expressed or implied theory presented in the part of technical field, the background art, the content of the disclosure or the embodiments.

Herein, certain terminology, such as the terms "first", "second" and the like, may also be used in the following specification for the purpose of reference only, and are thus not intended to be limiting. For example, the terms "first", "second" and other such numerical terms referring to structures or elements do not imply a sequence or order unless clearly indicated by the context.

Further, it should be noted that, the terms "comprise", "include", "have" and any other variants, as used herein, specify the presence of stated features, unity, steps, operations, units, and/or components, but do not preclude the presence or addition of one or more other features, unities, steps, operations, units and/or components, and/or groups thereof.

Figure 1:
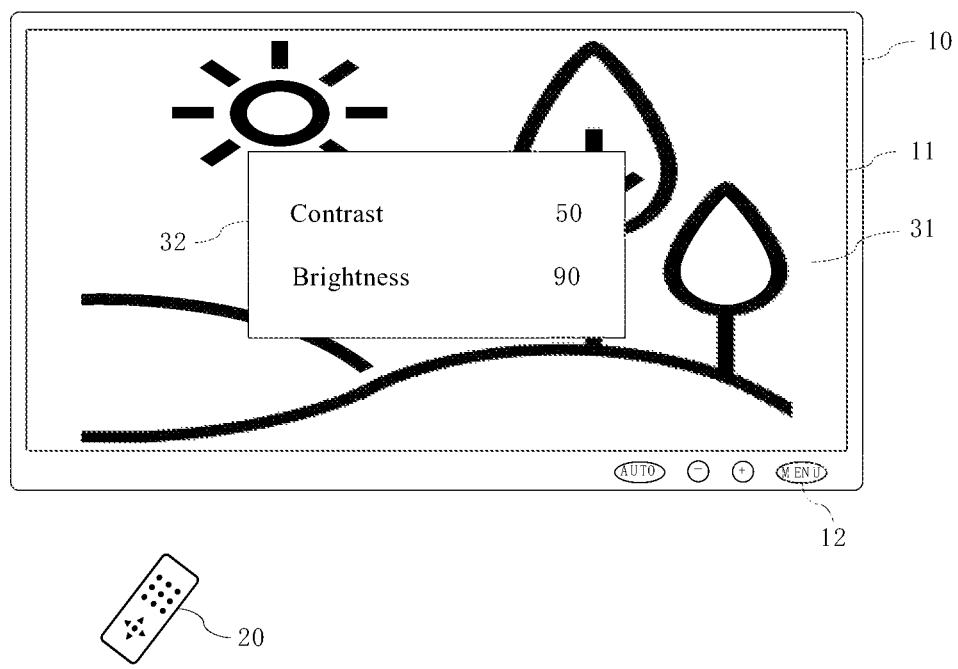
FIG. 1 is a schematic diagram of a conventional display.
Figure 2:
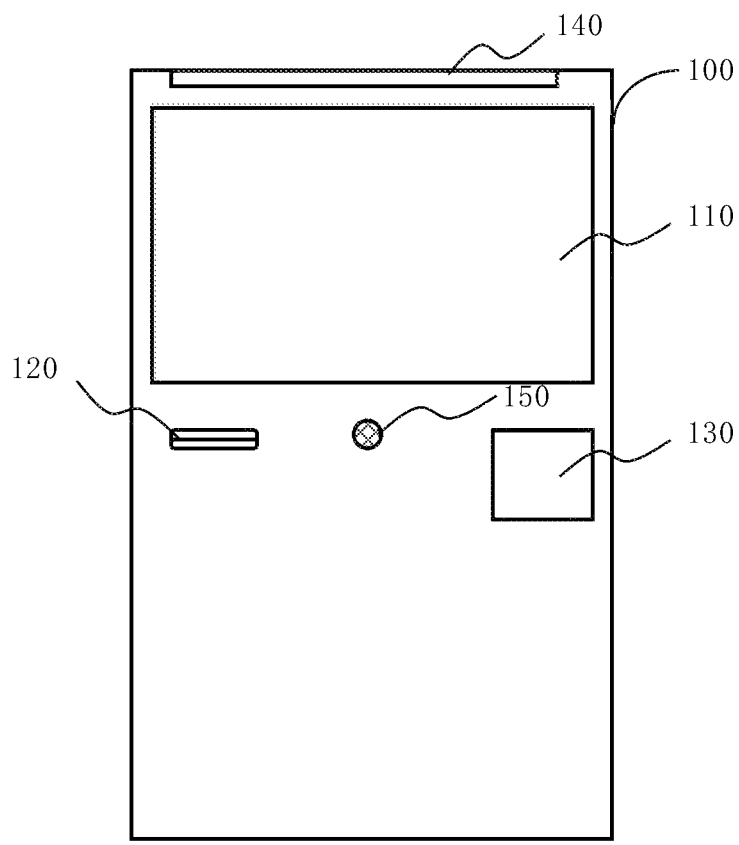
FIG. 2 is a schematic appearance diagram of a self-service device according to an exemplary embodiment of the present disclosure.

FIG. 2 is a schematic appearance diagram of a self-service device 100 according to an exemplary embodiment of the present disclosure. As shown in FIG. 2, the self-service device 100 is configured with a touch display screen 110, a printer (a printer paper outlet 120 is shown in the figure), a scanner (a scanning window 130 is shown in the figure), a light strip 140 and a microphone 150. Of course, the configuration components of the self-service device 100 are not limited to these components, but may be increased or decreased as required. For example, the self-service device 100 may also have other components such as a camera, a speaker, and a card reader.

The touch display screen 110 may be used to display a self-service user interface and interact with a user. It should be noted that the touch display screen 110 described here includes both a display and a touch screen in the following embodiments. The self-service device 100 may control operations of peripheral devices such as printers, scanners, light strips 140 and microphones 150 according to the interaction with the user, thereby realizing self-service for the user. The printer may be used to print vouchers such as tickets and shopping receipts. The scanner may be used to scan and read various identification marks such as QR codes and barcodes. The light strip 140 may indicate the status of the self-service device 100 with a color and light pattern of emitted light. The microphone 150 may collect the user's voice input for voice control or other operations.

The self-service device 100 shown in FIG. 2 may be used for various purposes (e.g., self-checkout, self-printing tickets, self-registration, self-consultation, etc.) in various industries (e.g., retail, restaurant, hospitality, medical, entertainment, transportation, industrial control, etc.). Common examples include any commercial electronic devices such as, vending machines in indoor and outdoor environments, kiosk systems in retail and tourism environments (such as route guidance machines in shopping malls), video game installations in public places, ATMs in banks, self-checkout machines in supermarkets, self-ordering machines in restaurants, self-service ticket machines at airports/stations, media players (such as advertising players) located in indoor and outdoor environments. Of course, the self-service device 100 is not limited to these application occasions, but may be used in various self-service occasions that do not require staff to operate, and the peripheral devices equipped in the device 100 may also be changed according to application occasions.

Figure 3:
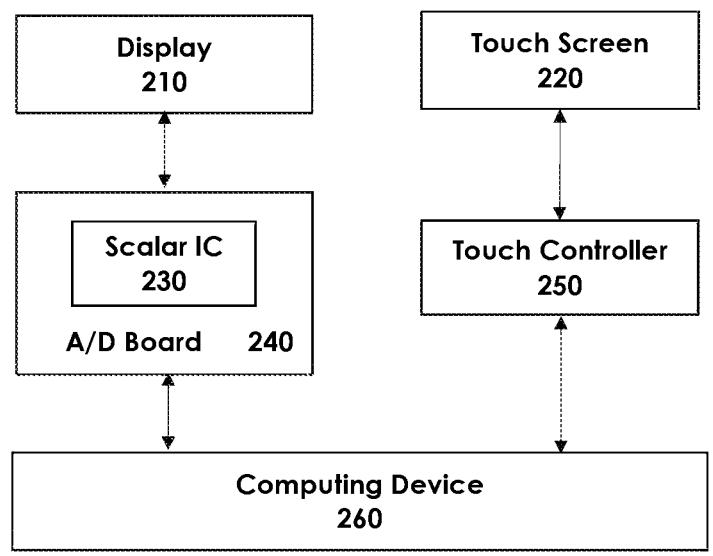
FIG. 3 to FIG. 5 are schematic structural block diagrams of a touch screen display system of a self-service device according to an exemplary embodiment of the present disclosure.

FIG. 3 is a schematic structural diagram of a touch screen display system 200 of a self-service device according to an exemplary embodiment of the present disclosure. The touch screen display system 200 includes a display 210, a touch screen 220, an analog-to-digital (A/D) board 240 having a scalar integrated circuit (IC) 230 disposed thereon, a touch controller 250, and a computing device 260. Although the display 210 and the touch screen 220 are shown as two separate boxes in FIG. 3, in practical applications, the touch screen 220 is usually located in front of the display 210 and overlapped with the display 210. The touch screen 220 includes an interactive surface that may be used to enable interaction between the self-service device and a user, which in one specific example may be a projected capacitive (PCAP) screen. The computing device 260 may execute software application programs, such as programs for self-service shopping, operation control programs for the self-service device, and the like. The display 210 serves as an output device to provide a screen representing one or more videos (including image(s)) related to an application program executed by the computing device 260. The touch controller 250 includes firmware that communicates with a software application program in the computing device 260 via a communication protocol to support performance characteristics of the software application program.

In some cases, an operator of the self-service device may touch various areas of the touch screen 220 that correspond to various areas in a displayed screen. Here, "touch" refers to physical contact between the touch screen 220 and the operator, or refers to an operation that the operator is sufficiently close to the touch screen 220 without physical contact therewith so as to destroy a local electrostatic field within the touch screen 220. The touch screen 220 may detect the presence, location, and/or movement trajectory of a touch operation, and the touch controller 250 may transmit signals indicating the presence, location, and/or movement trajectory of the touch operation to the computing device 260. The computing device 260 receives and analyzes these signals, so as to interpret the presence, location and/or movement trajectory of the touch operation into one or more operational commands and/or data from the operator. The computing device 260 executes the operational command and/or processes the data, and generates video data corresponding to output screens generated when and/or after executing the operational command and/or processing the data. The A/D board 240 receives the video data from the computing device 260 and converts the same into digital video signals, the scalar IC 230 performs screen scaling control, and the display 210 displays these screens.

The computing device 260 may include one or more processors and one or more memories, wherein the one or more processors are communicatively connected with the one or more memories. One or more of the one or more memories may be connected to the one or more processors via a bus, a port, or a network, and/or may be directly connected to or incorporated into any of the one or more processors. Each of the one or more memories may store contents accessible by the one or more processors, the contents may include instructions executable by the one or more processors, and data that may be retrieved, manipulated or stored by the one or more processors. The instructions and data may be associated with software application programs executed by the computing device 260.

The one or more memories may be any transitory or non-transitory computer readable storage medium capable of storing contents accessible by one or more processors, such as hard drives, memory cards, ROM, RAM, DVD, CD, USB memory, writable memory and read-only memory, etc. One or more of the one or more memories may include a distributed storage system, wherein instructions and/or data may be stored on a plurality of different storage devices that may be physically located in the same or different geographic locations.

The one or more processors may be any conventional processor, such as a commercially available central processing unit (CPU), graphics processing unit (GPU), microcontroller (MCU), or the like. Alternatively, the one or more processors may also be special-purpose components, such as application specific integrated circuits (ASICs) or other hardware-based processors. Although not required, one or more processors may include specialized hardware components to perform certain computational processes faster or more efficiently, such as the processing of data input from peripheral devices of the self-service device, the processing of images captured by a camera, or the processing of sounds collected by a microphone, etc.

Additionally, in some embodiments, one or more processors, one or more memories, and interfaces for peripheral devices (e.g., USB interfaces, A/D conversion interfaces, and UART interfaces, etc.) may be formed as one component, such as a chip microprocessor formed by being integrated on a single chip.

Figure 4:
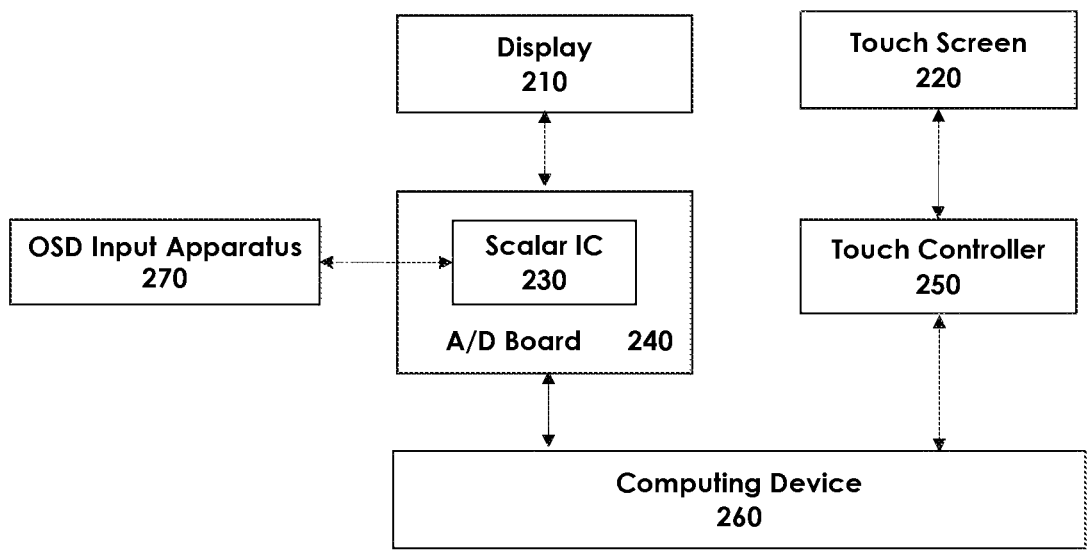

An OSD system is shown in the touch screen display system 200 shown in FIG. 4. In the self-service device, the OSD system for adjusting a configuration of the display 210 may include an OSD input apparatus 270 and a scalar IC 230. When a user operates the OSD input apparatus 270, the scalar IC 230 parses the operation of the user, transmits a control instruction corresponding to the operation to the display 210, and generates an OSD image associated with the operation at the same time. The scalar IC 230 further superimposes the generated OSD image with the screen corresponding to the video data received from the computing device 260, and transmits the video data superimposed with the OSD image to the display 210 for display.

Self-service devices are usually installed in public places for use by specific or unspecified groups of people, so the design considerations of OSD systems thereof are different from devices installed in private places for personal use. The OSD system of a device provided in a private place for personal use, such as a home TV, is designed so that a user may easily access the OSD system, so as to facilitate the user to adjust the display parameters according to his/her own preferences. For devices installed in public places for use by specific or unspecified groups of people, such as self-service ordering machines installed in fast food restaurants, many different users operate these devices every day, and it's usually not desired that display parameters of the machine are adjusted by the user when operating the machine, because adjustment results of the display parameters by one user may cause other users to be dissatisfied. Therefore, for self-service devices, the OSD system is designed so that ordinary users cannot adjust display parameters, and only certified technicians (e.g., those persons responsible for installing or maintaining self-service devices) may make such adjustments.

Figure 5:
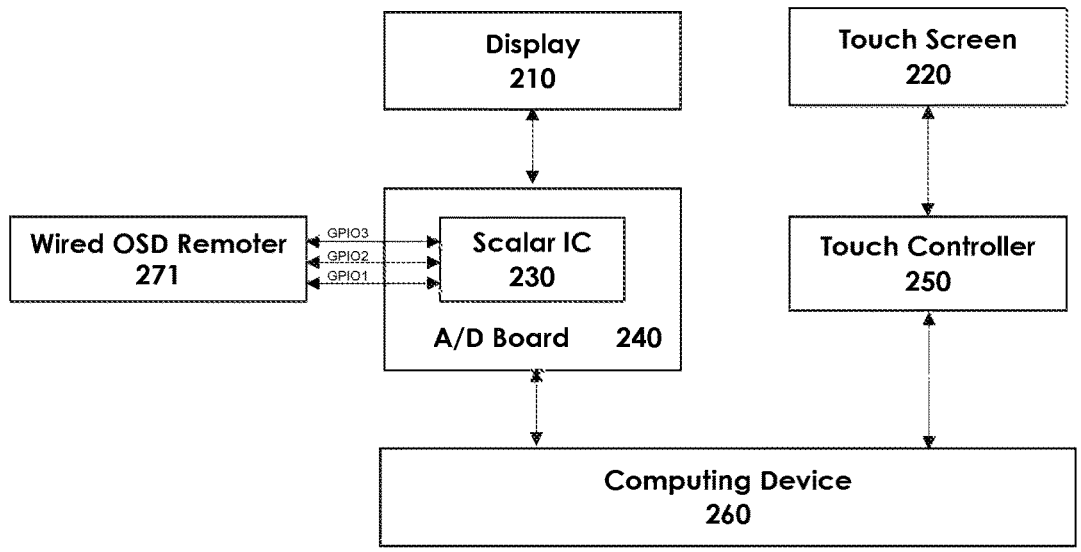

In order to avoid conscious or unconscious touch/press by ordinary users, in some examples, the self-service device is not provided with buttons and other components used as OSD input apparatus on its housing, but is provided with an OSD remote control (or a "remoter") as an OSD input apparatus. It should be understood that the OSD remote control may be integrated with other remote control means for controlling the self-service device into the same remote control, for example, a part of the remote control for controlling the self-service device may be used as an OSD remote control for operating the OSD system. In order to prevent the OSD remote control from being lost or operated by ordinary users, the OSD remote control is usually housed in an internal chamber formed by the housing of the self-service device. Technicians responsible for installation or maintenance may remove a faceplate of the self-service device or open a front/back cover of the self-service device to access the OSD remote control housed inside the self-service device. The OSD remote control allows technicians to fully operate the OSD system during installation and maintenance. After installation or maintenance is complete, the technician puts the OSD remote control back into the internal chamber of the self-service device and reinstalls the faceplate or closes the front/back cover, so that the OSD remote control is inaccessible for ordinary users. In a specific example, the OSD remote control is a wired OSD remote control. As shown in FIG. 5, the wired OSD remote control 271 may be connected to general input/output (GPIO) pins of the scalar IC 230 by wires to communicate with the A/D board 240.

In the above example, when the technician needs to adjust the display parameters of the self-service device, the housing of the self-service device must be opened to access the OSD remote control, which is inconvenient for the technician to operate. Therefore, there is a need to provide a method that allows technicians to conveniently use an OSD system of a self-service device, but at the same time causes the OSD system inaccessible to ordinary users.

Figure 6:
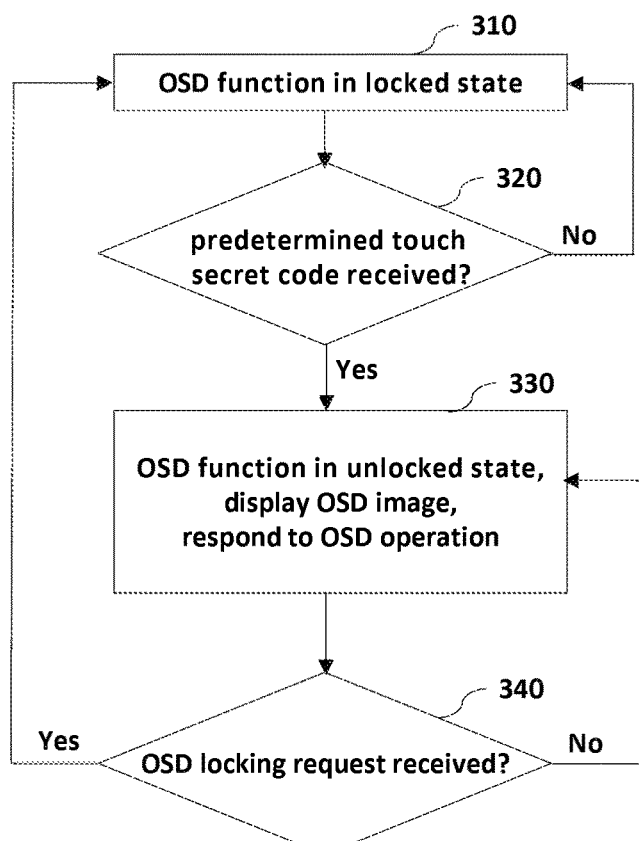
FIG. 6 is a schematic flowchart of a method of operating an OSD function for a public-place-device according to an exemplary embodiment of the present disclosure.

FIG. 6 is a schematic flowchart of a method 300 of operating an OSD function for a public-place-device according to an exemplary embodiment of the present disclosure. The term "public-place-device" as recited herein refers to devices installed in public places for use by specific or unspecified groups of people, such as the self-service devices and the like described in the present disclosure, which are different from devices installed in private places for personal use. The "OSD function" recited herein refers to a function provided by the OSD system of the device to perform an OSD configuration of the display of the device. The "OSD configuration" recited herein includes the configuration (i.e., setting, adjusting in context) of the display parameters of the display (such as color, resolution, screen size, grayscale, brightness, contrast, etc.), or the configuration of the speaker volume, input source, a power switch and the like of the display.

According to an embodiment of the present disclosure, the OSD function may be operated in a locked state that disables an OSD configuration of the display by an external entity, and in an unlocked state that enables an external entity to perform an OSD configuration of the display. The term "external entity" recited herein refers to any entity separated from the display of the device, which may include ordinary users of the device, and technicians installing/maintaining the device, as well as means (such as personal mobile devices of users, control means of the device, etc.) handheld by users (herein, refer to those who use the device, which may include ordinary users and technicians) that may interact with the device, and may also include OSD input apparatus (such as OSD keys or OSD remote controls, etc.).

The method 300 includes following steps: operating an OSD function in a locked state (an operation 310) and detecting a touch input through a touch screen of the device during normal using of the device (e.g., duration in which no OSD configuration is required). During normal using of the public-place-device, the OSD function is in the locked state. When the OSD function is in the locked state, the display of the public-place-device does not display an OSD image, for example, the device does not display an image related to adjustable parameters of the OSD system or the display. An ordinary user of the public-place-device may not even know that the device has an OSD function. The user may interact with the touch screen/display to conduct transactions, such as buying train tickets. When the OSD function is in the locked state, the OSD system providing the OSD function in the public-place-device does not respond to a touch input.

The method 300 further includes: causing the OSD function to operate in an unlocked state in response to detecting a predetermined touch secret code while the OSD function is in the locked state ("YES" for an operation 320) to output an OSD image on the display and conduct an OSD configuration on the display according to an OSD operation from an external entity (an operation 330). When the predetermined touch secret code is not detected while the OSD function is in the locked state ("NO" for the operation 320), the OSD function is kept operating in the locked state (the operation 310).

The term "secret code" recited herein refers to a secret code known to a specific person or group of people. The predetermined touch secret code, for example, may be a secret code known to technicians responsible for installing/maintaining the public-place-device but not known to ordinary users of the public-place-device. Before conducting an OSD configuration, the OSD function provided by the device must be unlocked. A technician who knows the predetermined touch secret code may input the touch secret code through the touch screen, so that the OSD function operates in an unlocked state. Due to the above-mentioned feature of the touch secret code, technicians may use it to unlock the OSD function, but ordinary users may not do so, thereby preventing ordinary users from conducting an OSD configuration on the device.

In some embodiments, the touch secret code includes a character secret code input through the touch screen, such as a string consisting of a plurality of letters, numbers and/or symbols. In these cases, when inputting a touch secret code, the public-place-device is usually required to display a virtual keyboard for inputting a character secret code on its display, and the user may input the touch secret code by touching an area of the touch screen corresponding to the keys on the keyboard. It should be noted that the user must enter the secret code (operation 320) before the OSD image is displayed (operation 330), so the virtual keyboard in these embodiments is not part of the OSD image. The virtual keyboard may be displayed by other software such as an application software running on the computing device 260 or the touch controller 250. In these embodiments, the application software may communicate touch input information to the OSD software that provides the OSD function. However, in some application scenarios, it is desirable to avoid the need to display a virtual keyboard for the entry of the secret code.

In some embodiments, the touch secret code includes a touch gesture secret code, i.e., a code built from touch gestures. In a specific example, the touch gesture secret code may be three swipes to left. Swipe to left is a touch gesture, and thus this touch gesture secret code is a code built from touch gestures. In another specific example, the touch gesture secret code may be two clicks on a left side of the touch area followed by two clicks on a right side of the touch area. In these cases, when inputting a touch secret code, the display of the device is not required to display a virtual keyboard for inputting a character secret code, and the display is even not required to display, or present in any other way, visual guidance thereon (e.g., no signage is required to indicate the user to touch a specific location).

Examples of touch gestures include swiping with one or more fingers simultaneously (including swipe to left, swipe to right, swipe up, or swipe down), zooming in or out with two or more fingers, clicking with one or more fingers (click on the left, middle or right of the touch screen), etc. All of these touch gestures depend on relative finger movement, instead of absolute touch location. Touch gestures are easily recognized by software, even if their absolute locations on the touch surface are different. For example, for a gesture of swipe to left, it doesn't matter whether a finger swipes from the top right to the top left of the touch surface, or from the bottom right to the bottom left of the touch surface. Due to this flexibility, a touch gesture input does not require any visual guidance which is required by menu selection in a touch manner. In addition, as mentioned above, touch gestures include swiping, zooming in/out, clicking, etc., and the code built by touch gestures (i.e., the code may be a sequence including one or more touch gestures) may have many possible values, it is thus difficult for a person who does not know the secret code to guess the secret code or to determine the secret code by trial and error.

Once the OSD function is in the unlocked state, the technician may perform an OSD operation to conduct an OSD configuration of the display of the public-place-device. In some embodiments, the OSD operation may include an operation performed by touching an area of the touch screen corresponding to at least part of the OSD image. After the OSD function is unlocked, the OSD image which includes an OSD navigation menu for user-friendly operations is output on the display. Technicians may adjust corresponding setting items by operating specific portions of the menu. As mentioned above, when the user performs OSD operations, in addition to changing the OSD configuration of the display, these operations are also displayed on the display in the form of OSD images, so that the user may observe the OSD operations performed by himself/herself. Since the OSD image is not displayed on the display when the OSD function is in the locked state, the user may not perform the OSD operation at all in these embodiments while the OSD function is locked. In some embodiments, the public-place-device may still retain OSD input apparatus, such as buttons, membrane switches, remote controls, etc., and OSD operations may include operations performed through specific OSD input apparatus. After the OSD function is unlocked, the technician may perform an OSD configuration of the display of the device through the OSD input apparatus. In these embodiments, even during the OSD function being in the locked state, the user may still perform OSD operations through the OSD input apparatus, but the device will not respond to the OSD operations in this duration. For example, during the OSD function being in the locked state, the user may press keys on the remote control for adjusting the brightness of the display, but the device will not change the brightness of the display, nor will it display an OSD image on the display indicating that the brightness has been adjusted.

The method 300 further includes: causing the OSD function to be operated in a locked state (the operation 310) in response to receiving an OSD locking request ("YES" for the operation 340) while the OSD function is in the unlocked state, so as not to output the OSD image on the display and not to respond to any OSD operations by external entities. While the OSD function is in the unlocked state, the technician may cause the OSD function return to the locked state through a locking request at any time.

In some embodiments, the OSD locking request may be the same touch secret code used to unlock the OSD function. The secret code is used as a toggle for switching the OSD function between unlocked and locked states. For example, if the OSD function is in a locked state, the user may unlock the OSD function by inputting a gesture secret code of swiping to left three times; if the OSD function is already in an unlocked state, the user may lock the OSD function by inputting a gesture secret code of swiping to left three times. In some embodiments, the OSD locking request may be another touch secret code different from the touch secret code used for unlocking the OSD function, for example, a specific string secret code or gesture secret code input on the touch screen, and the like. In a specific example, if the gesture secret code for unlocking the OSD function is swiping to left three times, the secret code for locking the OSD function may be swiping to right three times.

According to the above-mentioned embodiments of the present disclosure, the OSD function of the public-place-device is in an unlocked state only after a technician inputs a predetermined touch secret code. Since it is proper as long as the technician locks the OSD function after the OSD configuration work is completed, the OSD locking request may not be a secret code. In some embodiments, the OSD locking request may be a touch input by operating an area of the touch screen corresponding to an OSD locking indicator. For example, an icon may be displayed in a specific area of the display (e.g., an area corresponding to a specific part of the OSD image) to instruct the user to click on the icon to lock the OSD function. In some embodiments, the OSD locking request may be a signal indicating that no OSD operations have been received for a predetermined period of time. For example, a timer with a predetermined timing length (e.g., 30 seconds) may be started after each OSD operation is completed (e.g., at the end of each touch action); when the timer is running, if an OSD operation is received, the timer is stopped; and if the timer times out, a time out signal may be used as an OSD locking request. In this case, even if the technician forgets to lock the OSD function before leaving, it is guaranteed to lock the OSD function after a set period of time has elapsed, so that the OSD system may be prevented from being undesirably operated.

All or any part (including the above-mentioned methods, operations, procedures, steps, applications, programs, etc.) of the method of operating an OSD function of a public-place-device according to an exemplary embodiment of the present disclosure may be implemented in hardware, software, firmware, or any combination thereof. If implemented in software, the various functions may be implemented by one or more instructions stored on a memory, such as a computer-readable medium. If implemented in firmware, various functions may be implemented by a processor executing instructions, such as firmware code, stored in a memory. If implemented in hardware, various functions may be implemented by processing circuits.

Figure 7:
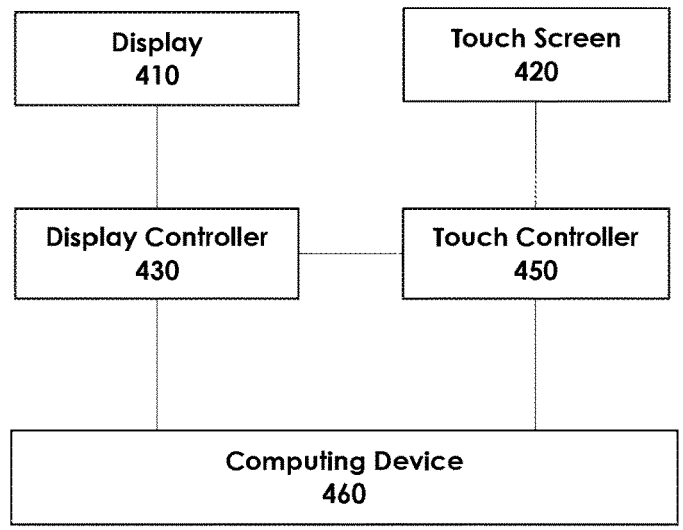
FIG. 7 is a schematic structural block diagram of a public-place-device according to an exemplary embodiment of the present disclosure.

FIG. 7 is a schematic structural block diagram of a public-place-device 400 according to an exemplary embodiment of the present disclosure. The public-place-device 400 includes a display 410, a touch screen 420, a display controller 430, a touch controller 450, and a computing device 460. The OSD system of the public-place-device 400 includes a touch controller 450 and a display controller 430, wherein the touch controller 450 and the display controller 430 are communicatively connected to each other directly. The display 410, the touch screen 420, the touch controller 450, and the computing device 460 may respectively include all or part of the functions of the display 210, the touch screen 220, the touch controller 250, and the computing device 260, described above. The display controller 430 may include all or part of the functions of the scalar IC 230 and the A/D board 240 described above, as well as a function of driving the display to display. Additional functions of various components in exemplary embodiments according to the present disclosure will be described in detail below. To avoid repetition, descriptions of the same or similar contents as those in the above-described embodiments will be omitted.

The touch controller 450 detects a touch input through the touch screen 420. In response to detecting the predetermined touch secret code, a first signal is sent to the display controller 430. The display controller 430, in response to receiving the first signal while the OSD function of the OSD system is in the locked state, causes the OSD function to operate in the unlocked state so as to output the OSD image on the display 410 and to respond to the OSD operation. In some embodiments, the touch controller 450 is connected to a GPIO pin of the display controller 430 so as to be in direct communication connection to the display controller 430. In response to detecting the predetermined touch secret code, the touch controller 450 changes a level of the corresponding GPIO pin of the display controller 430 (e.g., pulls up the level of the first GPIO pin) to send the first signal to the display controller 430. In other embodiments, the touch controller 450 may be communicatively connected to the display controller 430 directly by means of USB, IIC, RS232 or the like. When the predetermined touch secret code is detected, the touch controller 450 may send the first signal to the display controller 430 through a corresponding communication approach. In some embodiments, the predetermined touch secret code is recorded in firmware of the touch controller 450. In this case, the secret code may be changed by loading new firmware.

The display controller 430, in response to receiving the OSD locking request while the OSD function is in the unlocked state, causes the OSD function to operate in the locked state so as not to output the OSD image on the display 410 and not to respond to OSD operations. The OSD locking request includes at least one of the follows: a first signal; a second signal from the touch controller 450, wherein the second signal is a signal sent by the touch controller 450 to the display controller 430 in response to detecting a touch secret code other than the predetermined touch secret code; a touch operation performed on the area of the touch screen 420 corresponding to the OSD locking indicator parsed by the display controller 430; or a signal from the timer indicating that no OSD operation has been received within a predetermined period of time.

In the embodiments according to the present disclosure, the OSD function provided by the OSD system has a locked state and an unlocked state, and the OSD function may be unlocked to allow an OSD operation to be performed only when an external entity inputs a specific touch secret code. In this way, ordinary users of the device may be prevented from performing an OSD operation. In the embodiment according to the present disclosure, the OSD system may use the touch screen originally provided in the device as the OSD input apparatus to perform OSD function unlocking, OSD operation and OSD function locking, in this way, the device may not be equipped with other OSD input apparatus, thereby reducing hardware costs and simplifying the operation of technicians. In the embodiment according to the present disclosure, the touch controller and the display controller of the OSD system may communicate with each other directly without the computing device (such as the host computer) of the device, which enables the OSD system to operate independently of the host computer of the device. Therefore, such an OSD system has no requirements on the configuration of the computing device, and updates of OSD functionality do not require changes to the software running on the host computer.

Figure 8:
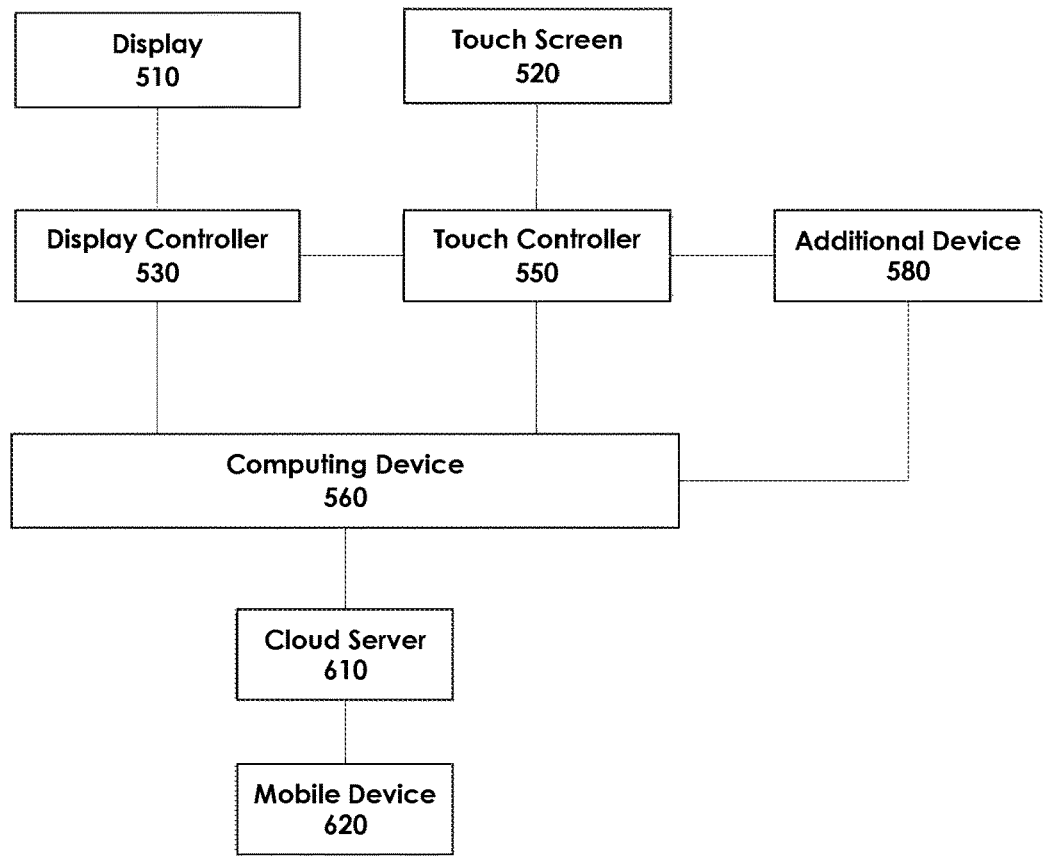
FIG. 8 is a schematic structural block diagram of a self-service device according to an exemplary embodiment of the present disclosure.

FIG. 8 is a schematic structural block diagram of a self-service device 500 according to an exemplary embodiment of the present disclosure. The self-service device 500 includes a display 510, a touch screen 520, a display controller 530, a touch controller 550, and a computing device 560. The computing device 560 executes application programs of the self-service device 500 and generates video data associated with the screens for output. The display controller 530 adapts the video data. The display 510 outputs a screen according to the adapted video data. The touch screen 520 receives a touch input. The touch controller 550 transmits touch signals associated with the touch input to the computing device. In addition, in some embodiments, the above-mentioned components may also include all or part of the functions of the corresponding components described above. Additional functions of various components in exemplary embodiments according to the present disclosure will be described in detail below. To avoid repetition, descriptions of the same or similar contents as those in the above-described embodiments will be omitted.

The touch controller 550 detects a touch input through the touch screen 520 and transmits a first signal to the display controller 530 in response to detecting a first specific touch input. The first specific touch input includes a predetermined touch gesture input, and the predetermined touch gesture input may be recorded in firmware of the touch controller 550. In some embodiments, the touch controller 550 may send the first signal to the display controller 530 by changing a level of a first GPIO pin of the display controller 530. In some embodiments, the touch controller 550 may send the first signal to the display controller 530 through at least one communication manner of USB, IIC and RS232. The display controller 530 unlocks the OSD function in response to receiving the first signal, so as to output an OSD image on the display 510. In response to an operation performed by touching an area of the touch screen 520 corresponding to at least part of the OSD image, and/or an operation performed by a specific OSD input apparatus, the display controller 530 performs a corresponding OSD configuration on the display 510.

During the OSD function being in an unlocked state, in response to receiving an OSD locking request, the display controller 530 locks the OSD function, so as not to output OSD images on the display 510, so that external entities may not conduct an OSD configuration on the display 510 during the OSD function being in a locked state. The OSD locking request may include at least one of the follows: a first signal; a second signal from the touch controller 550, wherein the second signal is a signal sent by the touch controller 550 to the display controller 530 in response to detecting a second specific touch input different from the first specific touch input; a touch operation performed on an area of the touch screen 520 corresponding to an OSD locking indicator parsed by the display controller 530; or signals from a timer indicating that no OSD operation has been received for a predetermined period of time.

In some embodiments, the self-service device 500 may further include a switch (not shown). The switch may control an on-off state of a power supply circuit for powering at least one of the computing device 560, an additional device connected to the computing device (e.g., an additional device 580), and the display 510. The touch controller 550 sends a third signal to the switch in response to detecting a third specific touch input. The switch changes an on-off state of the switch in response to receiving the third signal, thereby changing the on-off state of the power supply circuit. This allows a technician responsible for installing/maintaining the self-service device 500 to easily power off/on the above-mentioned devices so as to restart these devices by operating on the touch screen 520, for example, without opening the faceplate, the housing or the case cover and the like of the device 500, and without unplugging the main power supply of the device 500 always at the rear of the device 500 either.

In some embodiments, the self-service device 500 may further include a peripheral device (shown as the additional device 580), such as a 3D camera, a thermal sensor, or a speaker bar, among others. The firmware of the touch controller 550 may include a software tool for testing/diagnosing the peripheral device. The touch controller 550 operates the software tool in response to detecting a fourth specific touch input. For example, a technician may trigger a testing/diagnosing operation on a specific peripheral device by inputting a specific touch gesture secret code on the touch screen 520. In addition, the software tool for testing/diagnosing the peripheral device may also run on the computing device 560 (e.g., the host of the device 500).

In some embodiments, the touch controller 550 sends a fourth signal to the computing device 560 in response to detecting the fourth specific touch input. The computing device 560, in response to receiving the fourth signal, operates the software tool for testing/diagnosing the peripheral device. In these cases, a communication protocol between the touch controller 550 and the computing device 560 may be extended so that the touch controller 550 may request the computing device 560 to launch the required software tool (e.g., possibly after the computing device 560 is powered on). Alternatively, the touch controller 550 may simply transmit touch input data to the computing device 560, the latter determines whether it is a specific touch input that can trigger the operation of the software tool for testing/diagnosing the peripheral device. Alternatively, the communication between the touch controller 550 and the computing device 560 may also be performed via the display controller 530 (e.g., a scalar IC). For example, after the touch controller 550 detects the fourth specific touch input, the display controller 530 is notified, and the display controller 530 sends the fourth signal to the computing device 560. In this case, there are various options for digital data communication protocols between the display controller 530 and the computing device 560, including IIC, HDMI, USB-C (including DP auxiliary channel), and the like.

In some embodiments, the self-service device 500 may further include a mainboard (not shown), on which all or part of components such as the computing device 560 may be disposed. The touch controller 550 operates a software tool for diagnosing the mainboard in response to detecting a fifth specific touch input. Similar to the above-described embodiments, this software tool may be included in the firmware of the touch controller 550.

A provider or operator of the self-service device 500 may equip the device 500 with a cloud server 610, and the device 500 may communicatively connect to the cloud server 610 and communicate with the cloud server 610 by executing a cloud application program on the computing device 560. A user may communicatively connect a personal mobile device 620 to the cloud server 610 so as to interact with the device 500 by operating a cloud application program on the mobile device 620, such as controlling/configuring the computing device 560 of the device 500. In some embodiments, the touch controller 550 sends a sixth signal to the computing device 560 in response to detecting a sixth specific touch input. The computing device 560 executes the cloud application program to connect to the cloud server 610 in response to receiving the sixth signal.

While some specific embodiments of the present disclosure have been described in detail by way of examples, those skilled in the art will appreciate that the above examples are provided for illustration only, and are not intended to limit the scope of the present disclosure. The various embodiments disclosed herein may be combined arbitrarily without departing from the spirit and scope of the present disclosure. It will also be understood by those skilled in the art that various modifications may be made to the embodiments without departing from the scope and spirit of the present disclosure. The scope of the present disclosure is defined by the appended claims.

What is claimed is:

1. A self-service device, comprising:
    a computing device configured to run an application program of the self-service device and generate video data associated with a screen for output;
    a display controller configured to adapt the video data;
    a display configured to output the screen according to the adapted video data;
    a touch screen configured to receive a touch input;
    a peripheral device; and
    a touch controller configured to transmit a touch signal associated with the touch input to the computing device, wherein firmware of the touch controller comprises a software tool for testing/diagnosing the peripheral device, and wherein the touch controller is further configured to:
       detect the touch input through the touch screen, and send a first signal to the display controller in response to detecting a first specific touch input; and
       operate the software tool in response to detecting a fourth specific touch input; and
    the display controller is further configured to:
       unlock an On-Screen Display (OSD) function in response to receiving the first signal, so as to output an OSD image on the display; and
       conduct an OSD configuration of the display in response to an operation performed by touching an area of the touch screen corresponding to at least part of the OSD image and/or an operation performed by a specific OSD input apparatus.

2. The self-service device of claim 1, wherein the display controller is further configured to:
    lock the OSD function in response to receiving an OSD locking request while the OSD function is unlocked so as not to output the OSD image on the display, so that the OSD configuration of the display by an external entity is disabled while the OSD function is locked.

3. The self-service device of claim 1, wherein the first specific touch input comprises a predetermined touch gesture input recorded in the firmware of the touch controller.

4. The self-service device of claim 1, wherein an OSD locking request comprises at least one of:
    the first signal;
    a second signal from the touch controller, wherein the second signal is sent by the touch controller to the display controller in response to detecting a second specific touch input different from the first specific touch input;
a touch operation parsed by the display controller that is performed on an area of the touch screen corresponding to an OSD locking indicator; or
a signal from a timer indicating that no OSD operation has been received for a predetermined period of time.

5. The self-service device of claim 1, wherein the touch controller is further configured to:
send the first signal to the display controller through at least one of a GPIO connection, a USB connection, an IIC connection and an RS232 connection, in response to detecting the first specific touch input.

6. The self-service device of claim 1, further comprising:
a switch configured to control an on-off state of a power supply circuit for powering at least one of the computing device, a device connected to the computing device and the display, wherein the touch controller is further configured to:
send a third signal to the switch in response to detecting a third specific touch input; and
the switch is further configured to:
change the on-off state of the power supply circuit in response to receiving the third signal.

7. The self-service device of claim 1, further comprising:
a mainboard, on which the computing device is provided, wherein the touch controller is further configured to:
operate the software tool for diagnosing the mainboard in response to detecting a fifth specific touch input.

8. The self-service device of claim 1, wherein the touch controller is further configured to:
send a sixth signal to the computing device in response to detecting a sixth specific touch input; and
the computing device is further configured to:
execute a cloud application program in response to receiving the sixth signal, so as to connect to a cloud server.

9. A self-service device, comprising:
a computing device configured to run an application program of the self-service device and generate video data associated with a screen for output;
a display controller configured to adapt the video data;
a display configured to output the screen according to the adapted video data;
a touch screen configured to receive a touch input;
a peripheral device; and
a touch controller configured to transmit a touch signal associated with the touch input to the computing device, wherein the touch controller is further configured to:
detect the touch input through the touch screen, and send a first signal to the display controller in response to detecting a first specific touch input; and
send a fourth signal to the computing device in response to detecting a fourth specific touch input, and wherein the computing device is further configured to operate a software tool for testing/diagnosing the peripheral device in response to receiving the fourth signal; and
the display controller is further configured to:
unlock an On-Screen Display (OSD) function in response to receiving the first signal, so as to output an OSD image on the display; and
conduct an OSD configuration of the display in response to an operation performed by touching an area of the touch screen corresponding to at least part of the OSD image and/or an operation performed by a specific OSD input apparatus.

10. The self-service device of claim 9, wherein the display controller is further configured to:
lock the OSD function in response to receiving an OSD locking request while the OSD function is unlocked so as not to output the OSD image on the display, so that the OSD configuration of the display by an external entity is disabled while the OSD function is locked.

11. The self-service device of claim 9, wherein the first specific touch input comprises a predetermined touch gesture input recorded in firmware of the touch controller.

12. The self-service device of claim 9, wherein an OSD locking request comprises at least one of:
the first signal;
a second signal from the touch controller, wherein the second signal is sent by the touch controller to the display controller in response to detecting a second specific touch input different from the first specific touch input;
a touch operation parsed by the display controller that is performed on an area of the touch screen corresponding to an OSD locking indicator; or
a signal from a timer indicating that no OSD operation has been received for a predetermined period of time.

13. The self-service device of claim 9, wherein the touch controller is further configured to:
send the first signal to the display controller through at least one of a GPIO connection, a USB connection, an IIC connection and an RS232 connection, in response to detecting the first specific touch input.

14. The self-service device of claim 9, further comprising:
a switch configured to control an on-off state of a power supply circuit for powering at least one of the computing device, a device connected to the computing device and the display, wherein the touch controller is further configured to send a third signal to the switch in response to detecting a third specific touch input; and
the switch is further configured to change the on-off state of the power supply circuit in response to receiving the third signal.

15. The self-service device of claim 9, further comprising:
a mainboard, on which the computing device is provided, wherein the touch controller is further configured to operate the software tool for diagnosing the mainboard in response to detecting a fifth specific touch input.

16. The self-service device of claim 9, wherein the touch controller is further configured to send a sixth signal to the computing device in response to detecting a sixth specific touch input; and
the computing device is further configured to execute a cloud application program in response to receiving the sixth signal, so as to connect to a cloud server.

17. A self-service device, comprising:
a computing device configured to run an application program of the self-service device and generate video data associated with a screen for output;
a display controller configured to adapt the video data;
a display configured to output the screen according to the adapted video data;
a touch screen configured to receive a touch input;
a mainboard, on which the computing device is provided; and
a touch controller configured to transmit a touch signal associated with the touch input to the computing device, wherein the touch controller is further configured to:

detect the touch input through the touch screen, and send a first signal to the display controller in response to detecting a first specific touch input; and operate a software tool for diagnosing the mainboard in response to detecting a third specific touch input; and the display controller is further configured to:

unlock an On-Screen Display (OSD) function in response to receiving the first signal, so as to output an OSD image on the display; and conduct an OSD configuration of the display in response to an operation performed by touching an area of the touch screen corresponding to at least part of the OSD image and/or an operation performed by a specific OSD input apparatus.

18. The self-service device of claim 17, wherein the display controller is further configured to:

lock the OSD function in response to receiving an OSD locking request while the OSD function is unlocked so as not to output the OSD image on the display, so that the OSD configuration of the display by an external entity is disabled while the OSD function is locked.

19. The self-service device of claim 17, wherein the first specific touch input comprises a predetermined touch gesture input recorded in firmware of the touch controller.

20. The self-service device of claim 17, wherein an OSD locking request comprises at least one of:

the first signal;

a second signal from the touch controller, wherein the second signal is sent by the touch controller to the display controller in response to detecting a second specific touch input different from the first specific touch input;

a touch operation parsed by the display controller that is performed on an area of the touch screen corresponding to an OSD locking indicator; or a signal from a timer indicating that no OSD operation has been received for a predetermined period of time.

* * * * *